Jan. 14, 1964 J. C. HARDEN ETAL 3,117,438
DIFFERENTIAL THERMAL ANALYSIS APPARATUS
Filed Sept. 8, 1961 2 Sheets-Sheet 1

INVENTORS
JOHN CHARLES HARDEN
DONALD ARTHUR VASSALLO

BY *Bernd W. Sandy*

ATTORNEY

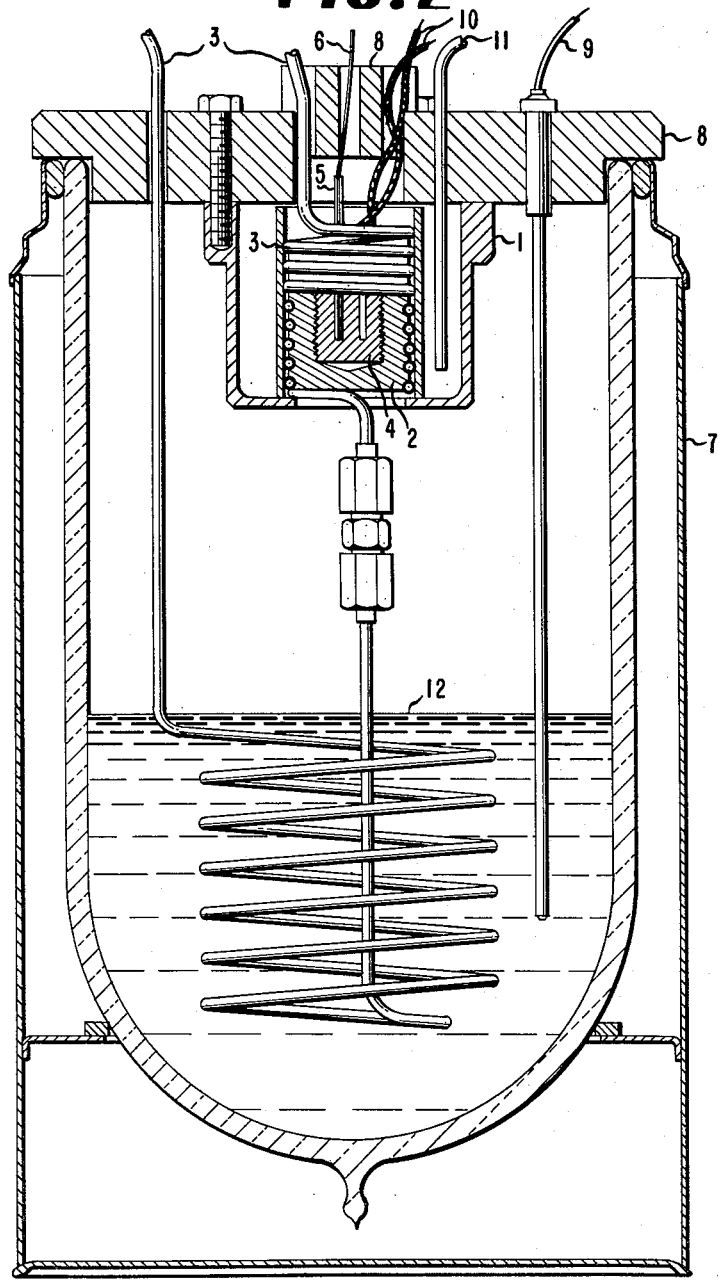

United States Patent Office 3,117,438
Patented Jan. 14, 1964

3,117,438
DIFFERENTIAL THERMAL ANALYSIS APPARATUS
John Charles Harden, 503 W. 19th St., Wilmington, Del., and Donald Arthur Vassallo, 2324 Godwin Circle, Orange, Tex.
Filed Sept. 8, 1961, Ser. No. 136,931
3 Claims. (Cl. 73—15)

The present invention relates to an apparatus for conducting thermal analyses and more particularly relates to a differential thermal analysis instrument which is useful in the characterization of organic and inorganic materials which heretofore could not be analyzed by this method.

Differential thermal analysis (DTA) is an analytical method which is employed to study the thermal behavior of one or more materials during thermal environmental changes. Basically, the method requires the measurement of the temperature differential between the material which is being analyzed and a standard which does not undergo a transition within the temperature range covered, as both are being heated or cooled simultaneously at a fixed rate. This temperature differential is constant until the sample being analyzed undergoes a thermal transition which either accelerates or retards its rate of temperature change. Differential thermal analysis is utilized in the analysis of organic compounds as well as a wide variety of inorganic materials. For many analyses, however, the precision, accuracy, sensitivity, and resolution of the method as commonly employed is unsatisfactory, especially when the sample being analyzed is either a mixture of components or a single multi-transition compound wherein the thermal transitions occur at closely related temperatures.

An object of the present invention is to provide a differential thermal analysis instrument which is useful for the analysis of organic and inorganic materials. A further object is to provide an instrument which is capable of analyzing mixtures of organic materials and/or mixtures of inorganic materials. Another object is to provide an instrument which is capable of analyzing polymeric materials, either alone or in mixtures. A further object is to provide an instrument which will permit determination of phase transitions, the heats of reaction of mixtures of materials undergoing chemical reactions and the heats of decomposition of materials being degraded. The principal object of this invention is to provide an instrument which is capable of rendering differential thermal analyses with a degree of precision, accuracy, sensitivity and resolution heretofore unrecognized in this analytical method. A still further object is to provide an instrument which has greater utility due to its broader use-temperature range at sub-zero as well as at elevated temperatures. Other objects will become apparent hereinafter.

Figure 1:
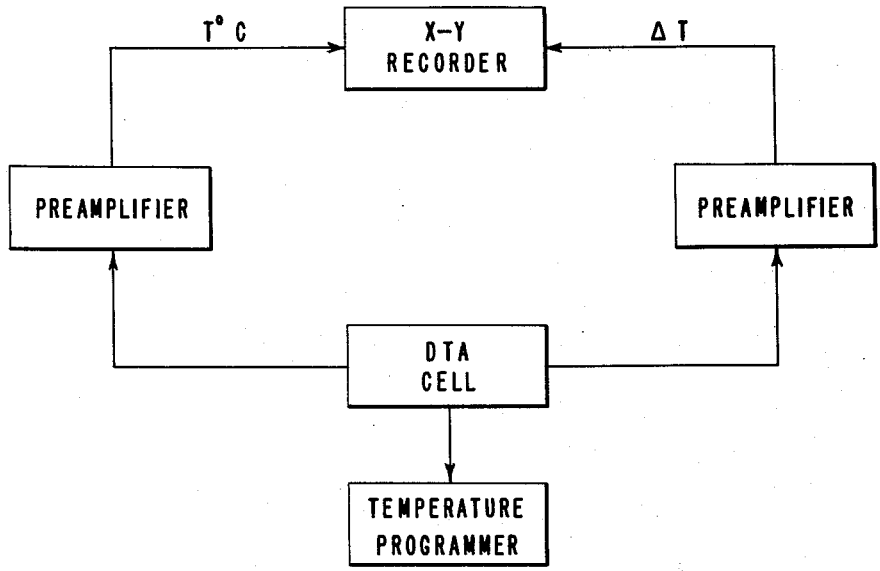

The objects of the instant invention are achieved by means of an instrument which has incorporated therein: a cell-block into which a sample and a reference material, each confined within a glass tube having a volume of 0.01–1.25 ml., may be inserted and then electrically heated or first refrigerant-cooled and then electrically heated at a controlled rate; a dual-walled, open-ended cell body which supports and insulates the cell-block and which in turn is attached to an insulating cover provided with a means for introducing a dry inert gas to blanket the block; electronic temperature sensing means for measurement of both the cell temperature and the differential temperature between the sample and reference material; a means of amplifying the electrical signals received from the temperature sensing means; a temperature programmer which permits heating to be carried out reproducibly and which enables heating to be integrated with the thermal transitions in the sample; a means of recording the differential temperature as a function of cell (sample) temperature. A schematic drawing of the apparatus is shown in FIGURE 1. Although individual units are shown for the preamplifiers and the recorder, in some cases sufficient amplification can be achieved in the recorder itself, thus eliminating the necessity for including separate preamplifiers. The components of the apparatus will be discussed in detail.

Temperature measurement may be by any of the well-known sensitive methods commonly employed to monitor thermal effects such as, for example, thermocouples, resistance thermometers, thermistors, bolometers, and the like. Because of ease of fabrication and their low cost, thermocouples are most frequently used. To minimize damping effects due to their sink-action, however, they must be as small as possible and should have a heat capacity less than 10% of the heat capacity of the sample or the reference material. For the temperature range covered herein #40 to #28 B. & S. (0.003 to 0.013" diameter) Chromel-Alumel, copper-constantan or platinum-platinum, rhodium thermocouples may be used.

Sample cell size, shape and material of construction are critical factors in the DTA apparatus because of the necessity for transferring heat to or from the sample and reference material quickly. The thermal conductivity of the material used for the cell should be such as to provide good heat transfer from block to sample or sample to block, but preferably not so high that the exotherm or endotherm being sought is obscured. In general, it has been found that the thermal conductivity (in gram calories transmitted per second through a plate of the material 1 cm. thick and 1 sq. cm. in area when the temperature difference between the two sides of the plate is 1° C.) should be greater than 0.1 at 18° C. Aluminum and nickel are two materials which are very useful for this component. Most sample cells used in the art are designed to accommodate multigram samples, with the result that their size must be sufficient to overcome within-sample thermal gradients. In the present invention the cell is designed on the basis of sample size and is such that 1–10 mg. of solid or 1–10 ml. of liquid are sufficient. In limiting the size of the sample to micro-quantities at least three important advantages are gained. Thermal gradients across the sample are essentially eliminated so that false peak widths, due to transitions occurring in various parts of the sample at different times, are eliminated. As a result, thermal transitions can be determined with a high degree of precision, accuracy, sensitivity and resolution. As a further result thereof, mixtures of materials having transitions occurring at closely related temperatures can be analyzed. Because the sample and sample chamber are extremely minute, the thermal conductivity of the atmosphere over the sample and reference material, likewise, can be neglected. It further has been discovered that although it normally is undesirable to interpose an insulator between the sample and/or reference and the cell block, an excellent balance between the heat transfer from cell to sample and from sample to cell is achieved in the present invention by employing glass sample and reference containers. The glass container is a tube having a 2 to 8 mm. outer diameter and a volume of 0.01 to 1.25 ml.

The sample-reference cell conveniently may consist of a solid cylinder which is threaded on the outside for insertion into the less than end to end threaded bore of a heater-cooler block which is fabricated from the same material as the sample cell. The heater-cooler, if cylindrical, may be threaded on the outside to permit encompassing with a coiled, Nichrome (60:25:15::Ni:Fe:Cr), heating wire and a tubular, metallic, cooling coil. Alternately, the sample block may be slightly tapered, instead of cylindrical and threaded, so as to fit snugly into the heater-cooler block, the inside of which is bored with a taper to match that of the sample block. Further alternately, the heater-cooler block, instead of being wrapped with Nichrome heating wire, may be heated by means of cartridge-type heaters which fit snugly into suitably spaced, less than end to end longitudinal bores. The number of cartridge heaters may be varied depending upon the desired temperature range to be covered. Two 30 watt heaters usually have been found adequate for the range covered in the instant invention. A still further alternate method of heating may be provided by the use of a high frequency induction-type heater. The composite sample cell, heater-cooler block is inserted into an open-ended, dual-walled, cell body which serves as an outer jacket and through which may be passed a blanket gas to exclude the atmosphere, particularly when operating below dew point. The cell body not only serves as a support but also as an insulator for the sample heater-cooler block. To function in its later capacity the cell body should be constructed from a material having a thermal conductivity $\lambda$ of less than 0.1 at 18° C. Stainless steel provides an excellent material of construction for the cell body, and in particular, #316 stainless steel containing 65–72 parts iron, 16–18 parts chromium, 10–14 parts nickel and 2–3 parts molybdenum. The entire unit may be affixed to the underside of a suitable insulating cover fitting over a Dewar flask which contains whatever refrigerant is necessary to reach the minimum desirable operating temperature. For example, it may contain a cooling medium such as liquid air, liquid nitrogen or liquid helium. When it is necessary to operate with a cooled block, a dry gas, for example, air, nitrogen, or helium, is passed through a tubular coil which is immersed in the cooling medium and which is connected in series with the cooling means of the heater-cooler block. The invention as thus described herein is capable of operating over a range of at least −240 to 1600° C. If it is necessary to operate over this entire range with a single instrument, the materials of construction must be selected with this in mind. For operations above 400° C. the cartridge or induction-type heater is preferred over the Nichrome heating wire. If only high temperature use is contemplated, the cooling means may be excluded.

The size of the cell body is 2.25–3.5″ x 1.50–3.25″ with the appropriate inserts described above being of proportionately smaller dimensions. A drawing of a sample-reference unit, exempli gratia, is shown in FIGURE 2. For most uses the cell body 1 may be fabricated from #316 stainless steel, the heater-cooler block 2, measuring 0.875–1.75″ x 1.25–2.5″, from cold drawn nickel, the gas cooling coil 3, from ⅛″ nickel tubing, and the sample cell 4, having dimensions 0.375–1.25″ x 1.0–1.5″, also from nickel. Sample cells (and heater-cooler blocks) which have less than the above minimum dimensions provide an excessively high noise to signal ratio, while those with dimensions above the maximum deleteriously affect the resolution afforded by the apparatus. The sample cell contains at least three suitably spaced 0.62–1.25″ x 0.079–0.315″ less than end to end bores, into two of which are inserted the glass tubes 5, containing the reference and sample materials and the appropriate thermocouples 6, and into the third, a glass tube containing the thermocouple 6, which controls the operation of a temperature programmer. FIGURE 2, also shows a Dewar flask 7, with insulating cover 8, refrigerant thermowell and thermocouple 9, cell heater 10, cell body blanket-gas inlet 11 and refrigerant 12.

As indicated hereinabove, thermocouple circuits may be used for temperature programming, differential temperature measurement between sample and reference and sample cell temperature measurement. The later may be effected using a thermocouple, Chromel-Alumel or platinum-platinum, rhodium, for temperatures above 0° C., or copper-constantan, for temperatures below 0° C., which is connected in bucking series with a reference thermocouple which is kept at 0° C. The resultant output may be fed either directly to the X-axis of a two axis graphic of plotting recorder or to a D.C. microvolt amplifier, and then to a recorder. The graphic recorder may have a selective range of 5 microvolts to 750 millivolts and is comprised of independent, self-balancing servo mechanisms. The minimum selectively may be increased from 5 microvolts if the signals are amplified by means of separate amplifiers rather than by using the amplification provided within the recorder. An example of an instrument which may be employed in conjunction with the aforesaid preamplifiers is a Mosely Model 4S Autograf recorder having a selectivity range of 7.5 to 750 millivolts. The amplifier should be a 0 to 2000 microvolt amplifier having a sensitivity of at least ±0.5% and a response time of no greater than 3 seconds. A Leeds and Northrup No. 9835–A may be used to satisfy these requirements. If it is desirable to investigate a very narrow temperature range, this can be done by expanding the X-axis by incorporating a bucking voltage in series with the signal at the input to the preamplifier. In a similar fashion the resultant signal from the differential temperature measurement circuit, wherein the sample and reference material thermocouples are coupled in bucking series after the sample thermocouple is itself coupled with 0° C. reference thermocouples, is fed, either directly or through a preamplifier to the Y-axis of the recorder. A marked improvement in precision and accuracy is realized by utilizing the same thermocouple for both sample and differential temperature measurement. The final thermocouple circuit is utilized to control the temperature programmer and, likewise, is coupled in bucking series with a reference thermocouple before being fed to the temperature programmer. In this case, the reference thermocouple frequently is placed in an appropriate thermowell immersed in whatever refrigerant is being used in the Dewar flask.

Figure 3:
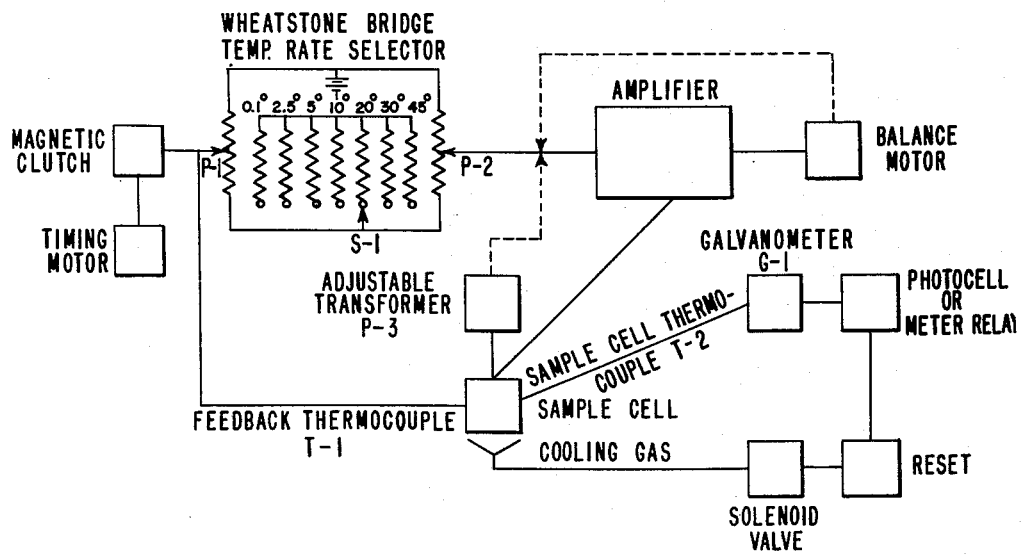

The heat source for the DTA cell is regulated by means of a temperature programmer, an integral part of the apparatus, which provides reproducible heating rates over the entire range of operation. The temperature programming control thermocouple, like the cell temperature and the differential temperature measuring thermocouples, is connected in bucking-series with a reference thermocouple. The latter is, as indicated above, placed in a cooling bath whose temperature matches the minimum temperature to be approached by the cell. The resultant bucking-series output is fed directly to a programmer which provides a feedback-type control of temperature. The temperature programmer may be based on a closed loop proportional controller principle such as is exemplified by FIGURE 3. Voltage to the Wheatstone bridge of such a programmer is supplied from a three volt dry cell in series with a fixed resistance which determines both the bridge voltage and the heating rate and, therefore, the millivolt bridge output taken from the 10-turn, 1000 ohm variable resistance P–1. Heating rates ranging from 0.1 to 45° C./minute can be achieved reproducibly. The resistance P–1 is coupled through a magnetic clutch which is actuated by a reset switch and linearly driven by a synchronous 3 r.p.h. timing motor. The unbalanced signal from the bridge is amplified, by means of an amplifier having a gain of at least $4 \times 10^6$, a sensitivity of at least 1 microvolt and an input impedance of no greater than 7000 ohms, for example, a Brown amplifier 356–358–1, and the output is applied to the phase sensitive balancing motor which is coupled through a gear train to the balancing variable resistance P–2 and the adjustable transformer P–3. As the temperature of the cell increases, the millivolt output of the thermocouple T–1 in series with the bridge output increases and is applied as a negative feedback to the bridge. Hence, an overshoot in cell temperature provides increased negative feedback from T–1 and a compensating input signal from the bridge is supplied to the amplifier by repositioning of P–2 and P–3, the latter thereupon reducing the voltage applied to the cell heater. Sample cell temperature is measured by thermocouple T–2 and shown on a galvanometer. For automatic cut-off a light source and photocells may be arranged on a temperature preset arm so that the metal vane of the galvanometer needle interrupts the light beam when the vane and set-point coincide. This thereupon activates the reset relay to disengage the magnetic clutch, halt the programmer and allow the cell to cool. Resistance P–1 is spring-loaded and automatically returns to zero. A second reset relay simultaneously may actuate a solenoid valve which releases a supply of gas through the refrigerant coil to accelerate cooling of the cell. As an alternate automatic cut-off may be used a thermocouple-actuated meter relay in place of the photocell assembly.

The apparatus as hereinabove described is useful for the analysis of solids and liquids. For the analysis of solids a 1–10 mg. sample is cold-pressed into a cylindrical plug, into which a thermocouple is inserted after warming the sample in the glass sample tube until just molten. The quantity of material in the reference compartment thereupon is adjusted to equate its heat capacity with that of the sample. To facilitate balancing the sample may be diluted with reference material. Alternately, the thermocouple may be embedded in a thin molten film of the sample which, after cooling, is sandwiched within the reference material. If the sample is expected to vaporize during the analysis, the reference ballast in the sample tube is essential and should be present in sufficient quantity to comprise greater than 85% of the total material in the sample tube. Liquid samples may be coated on the reference material while gaseous samples may be condensed into the sample tube and treated as liquids. In order to further improve the precision and accuracy of the analysis, the effective heat capacities of the sample and reference materials are finally balanced by vertically positioning either the sample or reference tube within the sample cell cavities until the baseline reading on the graphic recorder is flat. To effect positioning of the glass tube it is held in a microclamp which, after affixing to the heater-cooler block, can be positioned vertically by means of a vernier adjustment. Through use of the invention as herein described it is possible to analyze microsamples of organic and/or inorganic materials by means of differential thermal analysis over a range of at least —240 to 1600° C., at a heating rate of 0.1 to 45° C./minute with a precision and accuracy of ±0.1° C.

The following examples are given to demonstrate but not limit the usefulness of the invention as disclosed hereinabove.

*Example I*

Cylindrical plugs are fabricated from 0.005 gram of powdered sample and from sufficient reference material to balance its heat capacity with that of the sample. Into each plug is embedded a #40 B. & S. Chromel-Alumel thermocouple. Each plug is placed in a 2 mm. glass capillary and inserted into the appropriate sample cell compartment. The programmer thermocouple is inserted into a glass capillary which is placed into a third bore of the sample cell while its bucking-reference thermocouple is placed in the refrigerant thermowell. Heating rate is selected using switch S–1, the maximum cell operating temperature is set on the galvanometer G–1 (FIGURE 3), and a dry blanket-gas is passed through the outer chamber of the cell body. The programmer and recorder are actuated, after which the thermal profile of the sample is traced by the recorder. Using 0.0005″ diameter Pyrex glass beads as the reference material and a heating rate of 10° C./minute first order transitions are determined on the following materials:

| Material | Transition Temperature, ° C. (DTA) | Transition Temperature, ° C. (Literature) |
|---|---|---|
| Water | 0.5 | 0 |
| Benzene | 6 | 5.5 |
| Tristearin | 72 | 71 |
| Additional transitions | 55, 67 | 55, 65 |
| Benzoic acid | 124 | 122 |
| Ammonium nitrate | 171 | 170 |
| Additional transitions | 35, 89, 124 | 32, 85, 125 |

When measuring transitions above 400° C. a finely divided ceramic may be used as the reference material.

*Example II*

Ammonium nitrate is submitted to differential thermal analysis between room temperature and 300° C. The four endotherms occurring at 35, 89, 124 and 171° C. indicate crystalline transitions designated by X-ray diffraction as:

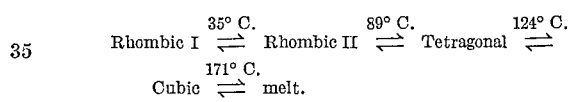

When dehydrated ammonium nitrate is used, the transitions at 35 and 89° C. disappear with a new transition appearing at 50° C. As the temperature is raised to 210° C., a sharp exotherm, indicating explosive decomposition, becomes apparent. It further is noted that in addition to water, the transitions in ammonium nitrate are highly dependent upon other impurities as well.

*Example III*

Using as little as 3 ml. in a glass capillary boiling points are determined on the following materials with the glass beads as reference, per Example I.

| Material | Boiling Point, ° C. (DTA) | Boiling Point, ° C. (Literature) |
|---|---|---|
| Butane | 1 | —0.6 |
| Acetone | 59 | 57 |
| Benzene | 83 | 80 |
| Water | 100 | 101 |
| n-Nonane | 152 | 151 |
| n-Dodecane | 215 | 215 |
| n-Tetradecane | 255 | 253 |
| 1-n-Hexadecene | 277 | 275 |

*Example IV*

Polymers and mixtures of polymers may be examined by DTA to indicate not only first and second order transitions but, also, chemical crosslinking, grafting, post-polymerization and polymer degradation. Mixtures of branched and essentially linear polyethylenes containing 1–2% of either type as the minor component are easily characterized, as are mixtures of other hydrocarbon polymers such as polypropylene and either branched or essentially linear polyethylene. An 8 mg. sample consisting of three hydrocarbon polymers, two polyamides, a polyformaldehyde and a perfluorinated resin was analyzed at a heating rate of 15° C./min. using glass beads as a reference. The observed transitions are as follows:

| Polymer: | Transition ° C. |
|---|---|
| Low density polyethylene | 111 |
| High density polyethylene | 130 |
| Polypropylene | 168 |
| Polyformaldehyde | 177 |
| Type 6 polyamide | 223 |
| Type 6/6 polyamide | 260 |
| Polytetrafluoroethylene | 20, 30, 325 |

*Example V*

When a sample of polytetrafluoroethylene is analyzed by DTA at a rate of 30° C./minute, transitions are seen at about 20° C., 30° C. and 325° C. When the heating rate is decreased to 5° C./minute, the first two transitions are resolved into peaks occurring at 17° C., 21° C., 26° C., and 30° C.

We claim:

1. A microanalytical instrument for measuring thermal transitions in liquid and solid materials, said instrument comprising: (a) a block containing at least three suitably spaced, less than end to end, longitudinal bores; each of said bores containing a closely fitting glass closed off at the end facing the base of the bore, the volume of said tube being 0.01 to 1.25 ml.; (b) a heat exchange means for adjusting temperature of said block between −240° and 1600° C.; a temperature sensing means within each glass tube, each temperature sensing means being coupled in bucking series with a reference temperature sensing means; (c) a dual-walled, open-ended cell body to support and insulate said block and to provide a means for blanketing the block with a dry inert gas to remove the atmosphere; (d) a temperature programmer controlling the heat exchange means for adjusting block temperature comprising a Wheatstone bridge to which voltage is supplied by a fixed D.C. supply in series with a selectable resistance to fix heating rate; said Wheatstone bridge also containing in parallel with the D.C. supply and resistance a variable resistance with a movable center post, driven by a slow speed timing motor, and connected to a block temperature sensing means; said Wheatstone bridge containing a second variable resistance in parallel with the first and, also, with a movable center post which is driven by a balancing motor and which is connected to an amplifier; said amplifier, also, having as an input the signal from a block temperature sensing means, with the output of said amplifier attached to: (i) the same balancing motor which drives the movable center post of the second parallel Wheatstone bridge variable resistance and, (ii) the adjustable transformer supplying voltage to the electrical resistance heating means; (e) a means of amplifying the resultant signals from the sample temperature and the sample-reference differential sensing means; (f) a means of recording the differential signal from the sample-reference temperature sensing means as a function of the signal of the sample temperature sensing means.

2. An apparatus according to claim 1 wherein said block consists of two components, said components being a sample cell having dimension 0.375–1.25″ x 1.0–1.5″ and a heater-cooler block having dimensions 0.875–1.75″ x 1.25–2.5″.

3. An apparatus according to claim 1 wherein said amplifier of said temperature programmer has a gain factor of at least $4 \times 10^6$, a sensitivity of at least 1 microvolt and an input impedance of no greater than 7000 ohms.

References Cited in the file of this patent

UNITED STATES PATENTS

| 2,986,028 | Shawhan | May 30, 1961 |
| 3,033,020 | Pakulak et al. | May 8, 1962 |

FOREIGN PATENTS

| 320,193 | Great Britain | Oct. 10, 1929 |

OTHER REFERENCES

Smothers et al.: Differential Thermal Analysis. N.Y., Chemical Publishing Co., Inc. 1958 QD 515 S5.

Haighton et al.: Differential Thermal Analysis of Fats. In Journal of American Oil Chemist's Society. pp. 344–347, July 1958, TPl Q5.

Pakulak et al.: Thermistorized Apparatus for Differential Thermal Analysis. In Analytical Chemistry. pp. 1037–1039, June 1959.

Hogan et al.: Apparatus for Observing Physical Changes at Elevated Temperatures. In Analytical Chemistry. pp. 573–574, April 1960.